United States Patent
Akatsuka et al.

(10) Patent No.: US 7,109,288 B2
(45) Date of Patent: Sep. 19, 2006

(54) CURED THERMOSETTING RESIN PRODUCT

(75) Inventors: Masaki Akatsuka, Saitama (JP); Yoshitaka Takazawa, Hitachinaka (JP); Katsuo Sugawara, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 86 days.

(21) Appl. No.: 10/477,926

(22) PCT Filed: May 18, 2001

(86) PCT No.: PCT/JP01/04177

§ 371 (c)(1), (2), (4) Date: Nov. 18, 2003

(87) PCT Pub. No.: WO02/094905

PCT Pub. Date: Nov. 28, 2002

(65) Prior Publication Data

US 2004/0147709 A1    Jul. 29, 2004

(51) Int. Cl.
C08G 63/00 (2006.01)
C08G 59/00 (2006.01)

(52) U.S. Cl. ....................... 528/365; 528/271

(58) Field of Classification Search ............... 528/87, 528/106, 403, 418, 419, 421
See application file for complete search history.

(56) References Cited

U.S. PATENT DOCUMENTS

| | | | |
|---|---|---|---|
| 5,414,125 A * | 5/1995 | Hefner et al. | 564/305 |
| 5,773,178 A | 6/1998 | Shiota et al. | |
| 5,811,504 A | 9/1998 | Shiota et al. | |
| 5,904,984 A * | 5/1999 | Smith et al. | 428/396 |
| 6,261,481 B1 * | 7/2001 | Akatsuka et al. | 252/567 |
| 6,765,043 B1 * | 7/2004 | Akatsuka et al. | 523/457 |

FOREIGN PATENT DOCUMENTS

| | | |
|---|---|---|
| DE | 42 26 994 | 2/1994 |
| EP | 0 944 098 | 9/1999 |
| JP | 61-296068 | 12/1986 |
| JP | 63-264828 | 11/1988 |
| JP | 01-149303 | 6/1989 |
| JP | 02-005307 | 1/1990 |
| JP | 02-028352 | 1/1990 |
| JP | 02-127438 | 5/1990 |
| JP | 09-118673 | 5/1997 |
| JP | 11-323162 | 11/1999 |

OTHER PUBLICATIONS

C.L. Choy, et al., "Thermal conductivity of highly oriented polyethylene" Polymer Feb. 1978, vol 19, pp. 155-162.
Kurt Geibel, et al., In Situ Photopolymerized, Oriented Liquid-Crystalline Diacrylates with High Thermal Conductivities:, Adv. Mater. 1993, vol. 5, No. 2, pp. 107-109.

* cited by examiner

*Primary Examiner*—Michael J. Feely
(74) *Attorney, Agent, or Firm*—Antonelli, Terry, Stout and Kraus, LLP.

(57) ABSTRACT

This invention provides a thermosetting resin compound containing 25% or more by volume of anisotropic structure in the resin ingredient, wherein a structure constituting said anisotropic structure has a covalent bond and the maximum diameter of the structure is 400 nm or more. The resin ingredient of said thermosetting resin compound is preferably a hardened epoxy resin compound containing a mesogen-structured epoxy resin monomer and an epoxy resin hardening agent. The epoxy resin monomer in the thermosetting resin compound is preferably an epoxy resin monomer expressed by the following formula: E-M-S-M-E, wherein E, M, and S respectively indicate an epoxy group, a mesogen group, and a spacer. Therefore, this invention can provide a highly thermal conductive hardened thermosetting resin compound whose thermal conductivity is increased highly.

2 Claims, 2 Drawing Sheets

CURED THERMOSETTING RESIN PRODUCT

TECHNICAL FIELD

This invention relates to an insulating material for electric and electronic apparatus and particularly to thermosetting resin compounds having excellent thermal conductivity.

BACKGROUND OF THE INVENTION

Almost all electric and electronic apparatus ranging from motors and electric generators to printed circuit boards comprise conductors to convey electricity and insulating materials.

Recently, these apparatus have been downsized rapidly and required insulating materials of higher characteristics. Further, as the apparatus are downsized and their conductors are packed more densely, they generate more heat. To dissipate this lot of heat has been a great problem to be solved.

Conventionally, thermosetting resin compounds have been used widely as insulating materials for various electric and electronic apparatus, judging from their high insulating characteristics, easy molding capability, and high thermal resistance, Generally, however, the thermal conductivity of the thermosetting resin is low and not enough to dissipate a lot of heat of highly-densed conductors. Therefore, high-conductivity insulating materials have been much required.

Compounds made of a mixture of a thermosetting resin and highly thermal-conductive filler powder have been well-known as high-conductivity materials. There are various kinds of filler powder under study: powder of metal such as silver or aluminum and powder of inorganic ceramic such as silicon dioxide, aluminum oxide, magnesium oxide, beryllium oxide, boron nitride, aluminum nitride, silicon nitride, silicon carbide, aluminum fluoride, or calcium fluoride.

However, filler powder in a thermosetting resin will increase the viscosity of the resin strikingly, make it difficult to manufacture microstructures of resin, and reduce their workability.

Further, the thermal conductivity of the thermosetting resin is extremely low and a little amount of filler powder does not improve the thermal conductivity of the resin so much. To improve the thermal conductivity of the resin, a large quantity of filler material must be added to the resin. However, it is substantially difficult to disperse such a large quantity of filler powder uniformly in the resin.

Furthermore, in most cases, the affinity of filler powders to the thermosetting resin that is one of organic compounds is not so strong. This may easily cause interfacial separation between the filler powder and the resin and consequently reduce the insulation performance of the resin dramatically when it is used for a long time.

From this point of view, it is very important to prepare organic materials of high thermal conductivity.

A preparation of a high thermal-conductivity plastic compound filled with super-highly oriented polymer fibers has been disclosed as a method for preparing organic materials of high thermal conductivity by Japanese Laid-Open Patent Publication No. Sho 61-296068. This method uses a characteristic that super-highly oriented polymer fibers described in POLYMER Vol.19, page 155 (1978) improve the thermal conductivity along their orientation axis.

However, the super-highly oriented polymer fibers are not so thermal-conductive across the orientation axis. So, if dispersed randomly in the organic insulating compounds, such polymer fibers will seldom or never improve the thermal conductivity of the compound.

It is possible to prepare an organic insulating material having an excellent thermal conductivity along the orientation of polymer fibers by orienting polymer fibers in a certain direction in the organic insulating compound, but the thermal conductivity of the insulating material falls in the other directions.

Further, ADVANCED MATERIALS Vol.5, page 107 (1993) and Germany Patent Specification 4226994 disclose anisotropic materials having a high thermal conductivity in the in-plane direction of the film in which molecular chains are disposed, which are prepared by orienting monomer having mesogen groups such as diacrylate and bridging thereof. However, this material has less thermal conductivity in the other directions, particularly, in the in-depth direction of the film.

Generally, as for film materials, most of heat transfers in the in-depth direction of the film material. Therefore, this kind of material is not effective for electric and electronic apparatus.

There has also been an approach to a method for disposing molecular chains in the in-depth direction. Japanese Laid-Open Patent Publication No. Hei 01-149303, Hei 02-5307, Hei 02-28352, and Hei 02-127438 disclose methods for manufacturing organic materials such as polyoxymethylene and polyimide in the presence of an electrostatic potential.

Further, Japanese Laid-Open Patent Publication No. Sho 63-264828 discloses a material having molecular chains oriented in the in-depth direction by laminating molecule-oriented polypropylene or polyethylene sheets with their molecules oriented in the same direction, bonding thereof firmly, and slicing thereof perpendicularly to the orientation of the molecular chains.

Indeed, these methods can prepare materials having high thermal conductivity in the in-depth direction of the film, but their molding becomes very complicated and only a limited number of such materials are available.

Japanese Laid-Open Patent Publication No. Hei 11-323162 discloses an insulating compound having a thermal conductivity of 0.4 W/m·K or more prepared by polymerizing mesogen-structured monomer.

This insulating compound is spatially almost isotropic and high in thermal conductivity, but can increase the in-depth thermal conductivity without any complicating molding method. The thermal conductivity of this compound is about 0.4 to 0.5 W/m·K.

Japanese Laid-Open Patent Publication No. Hei 09-118673 discloses a liquid crystal thermosetting monomer having two mesogen groups and a liquid crystal thermosetting polymer having a smectic structure prepared from this monomer. This liquid crystal thermosetting polymer can form a smectic structure which is oriented highly, but Japanese Laid-Open Patent Publication No. Hei 09-118673 never refers to the thermal conductivity of this polymer.

Judging from the above, it is an object of the present invention to provide a highly thermal-conductive thermoset resin whose thermal conductivity is increased highly while keeping an almost isotropic spatial structure.

DISCLOSURE OF THE INVENTION

This invention to accomplish the above object is summarized as follows:

[1] A thermoset (hardened thermosetting) resin containing 25% or more by volume of anisotropic structures in the resin ingredient, wherein a structure constituting said anisotropic structures has a covalent bond and the maximum diameter of the structure is 400 nm or more.

[2] The thermoset resin of [1] wherein the resin ingredient of said thermosetting resin compound is a hardened epoxy resin compound containing a mesogen-structured epoxy resin monomer and an epoxy resin hardening agent.

[3] The thermoset resin of [2] wherein said epoxy resin monomer has a structure expressed by Formula (1) below $$E\text{-}M\text{-}S\text{-}M\text{-}E \qquad (1)$$

(where E, M, and S respectively indicate an epoxy group, a mesogen group, and a spacer).

The thermoset resin of this invention indicates a hardened resin compound whose resin components are bridged by heating.

Typical resin compounds are hardened materials of unsaturated polyester resin, epoxy resin, acrylic resin, phenol resin, melamine resin, urea resin, urethane resin, and so on. Particularly, epoxy resins are typical because they are excellent in insulation performance and thermal resistance. These resin components can contain monomers, bridging agent, flexing agent, thinner, adulterant, etc.

In addition to the above resin as the main ingredient, the thermoset resin compound of this invention can contain metal, inorganic ceramic, organic powder, woven cloth, non-woven cloth, short fibers, long fibers, etc. In this case, these components have no influence on the thermal conductivity of the resin component. Therefore, the resin component can keep its high thermal conductivity.

The anisotropic structure described in this invention indicates a structure having micro configurations such as crystal phases and liquid crystal phases. These structures in resins can be easily observed by a polarization microscope as Moire fringes in the crossed Nicol field by the depolarization method.

The anisotropic structures usually exist like islands in the resin and the structures of the anisotropic structures of this invention indicate the island. In accordance with the invention, the structures must contain covalent bonds.

The maximum diameter of the anisotropic structures and the ratio of the anisotropic structures of this invention can be calculated by means of direct observation through a transmission electron microscope (TEM). A detailed calculation method will be described in embodiments.

The mesogen group in this invention is a functional group that can generate liquid crystallinity. Substantially, mesogen groups are biphenyl, phenylbenzoate, azobenzene, stilbene, and their derivatives.

The epoxy resin monomer in this invention is a monomer having at least one epoxy group. Further, the epoxy resin monomer preferably has a mesogen group. Substantially, they are epoxy resin monomers having, in the molecule, at least one of mesogen groups such as biphenyl, phenylbenzoate, stilbene, and azobenzene groups and twin mesogen type epoxy resin monomers having two or more of such groups in the molecule.

Particularly, a twin-mesogen type epoxy resin having a general formula (1) below is preferable to improve the diameter of the anisotropic structure and the ratio of the anisotropic structure.

$$E\text{-}M\text{-}S\text{-}M\text{-}E \qquad (1)$$

(where E, M, and S are respectively epoxy group, mesogen group, and spacer in this order.)

The epoxy resin hardening agent in this invention is a hardening agent for hardening the epoxy resin. Substantially, the hardening agents are polyaddition type hardening agents (such as acid anhydride hardening agent, polyamine hardening agent, polyphenol hardening agent, and polymercaptan hardening agent), ion polarization type catalytic hardening agents, potential hardening agents, and so on.

In other words, the highly thermal conductive hardened thermosetting resin compound of this invention is a highly thermal conductive hardened thermosetting resin compound whose thermal conductivity is much increased while keeping an almost isotopic spatial structure. As this thermosetting resin itself has a high thermal conductivity, the resin can have a higher thermal conductivity for example when one part of high thermal-conductivity filler powder is added to one part of this resin.

Accordingly, when the filler and the thermosetting resin have the same thermal conductivity, the amount of filler powder to be added can be reduced. This can reduce the viscosity of the resin before hardening and increase the workability thereof.

As explained above, the highly thermal conductive hardened thermosetting resin compound of this invention has a great effect and are suitable for insulation layers for electric generators, motors, and transformers, semiconductor packaging materials, interlayer insulation films of laminated wiring boards, substrate units, adhesive sheets, coating type adhesives, resin fillers, binder resins, and heat-radiating plates.

BEST MODE TO PUT THE INVENTION INTO PRACTICE

The present invention will now be described more fully in detail with some examples in which names of epoxy resin monomers, epoxy resin hardening agents, and acrylic resin monomers are symbolized for simplification.

[Epoxy Resin Monomers]

Tw8: 4-(oxylanylmethoxy)benzoic acid-4,4'-[1,8-octanediylbis(oxy)]bisphenolester Tw6: 4-(oxylanylmethoxy)benzoic acid-4,4'-[1,6-hexanediylbis(oxy)]bisphenolester Tw4: 4-(oxylanylmethoxy)benzoic acid-4,4'-[1,4-butanediylbis(oxy)]bisphenolester BzE: 4-(4-oxylanylbutoxy)benzoic acid-1,4'-phenylene ester BiE: 4,4'-biphenoldiglycidylether TME: 3,3,5,5'-tetramethyl-4,4'-biphenoldiglycidylether BAE: Bisphenol-A-diglycidylether

[Epoxy Resin Hardening Agents]
DDM: 4,4'-diaminodiphenylmethane
DDE: 4,4'-diaminodiphenylether
DDS: 4,4'-diaminodiphenylsulfon
DDB: 4,4'-diamino-3,3'-dimethoxybiphenyl
DSt: 4,4'-diamino-α-methylstilben
DBz: 4,4'-diaminophenylbenzoate
[Acrylic Resin Monomers]
BzA: 4-(6-acryloylhexyloxy)benzoic acid-1,4'-phenyleneester
[Acrylic Resin Hardening Agents]
BPO: Benzoyl peroxide
DPA: ω, ω-dimethoxy-ω-phenylacetophenone

[Embodiment 1]

We prepared a 5 mm-thick high-conductive thermosetting resin plate by fusing and mixing Tw8 and DDM (at stoichiometric quantities) at 160° C. for 10 hours in advance, injecting thereof into a mold which was treated with a mold-releasing agent, and heating thereof to harden. For detailed conditions of preparation, see Table 1.

We put this resin plate between two polarization plates in the crossed Nicol field and observed Moire fringes due to the depolarization through a microscope. Therefore, we assumed that this resin plate has an anisotropic structure.

Further, we observed anisotropic structures in this resin plate (dyed by $RuO_4$) by a TEM at a power of 30,000. The maximum diameter of the anisotropic structures is 1600 nm and the ratio of the anisotropic structure is 40% by volume. We determined boundaries of the anisotropic structures by controlling the contrast of the obtained images.

Figure 1:
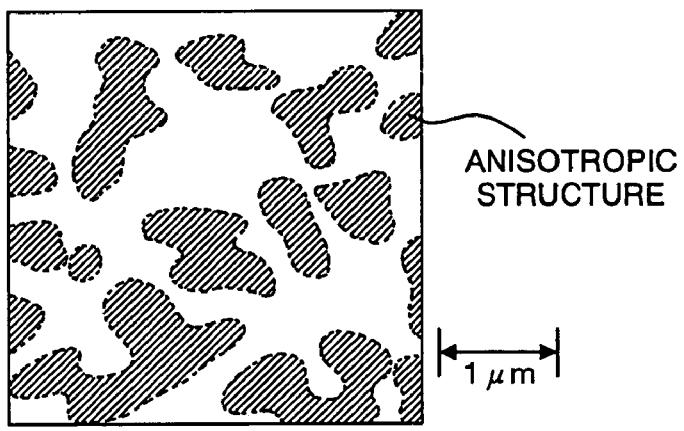
FIG. 1 shows an example of TEM view of the highly thermal conductive hardened thermosetting resin compound of this invention.

FIG. 1 shows a microscopic view of the resin plate in which anisotropic structures are determined. As the anisotropic structures are similarly dispersed also in the in-depth direction, we calculated the ratio of the anisotropic structure in the resin as the ratio of the anisotropic structure area to the whole view area (of the picture). We measured the lengths of longest parts of anisotropic structures and took the greatest one of the measured values as the maximum diameter of the anisotropic structure.

The measured thermal conductivity of this resin plate is 0.83 W/m·K, which is very high. We measured the in-depth thermal conductivity of this resin plate at a sample temperature of about 80° C. by a plate comparison method (using a borosilicate glass as a reference sample). The measured thermal conductivities of resin examples are listed in Table 2.

TABLE 1

| No. | Monomer | Hardener | Compounding ratio | Hardening temperature (° C.) |
|---|---|---|---|---|
| Embodiment 1 | Tw8 | DDM | Stoichiometric quantity | 150 |
| Embodiment 2 | Tw6 | DDE | Stoichiometric quantity | 180 |
| Embodiment 3 | Tw4 | DDS | Stoichiometric quantity | 200 |
| Embodiment 4 | BAE | DSt | Stoichiometric quantity | 180 |
| Embodiment 5 | BzE | DBz | Stoichiometric quantity | 180 |
| Embodiment 6 | BzA | BPO | 0.5 wt % | 80 |
| Comparative example 1 | BzE | DBz | Stoichiometric quantity | 230 |
| Comparative example 2 | BiE | DDM | Stoichiometric quantity | 180 |
| Comparative example 3 | BiE | DBi | Stoichiometric quantity | 180 |
| Comparative example 4 | BzA | DPA | 0.5 wt % | 50* |
| Comparative example 5 | TME | DBi | Stoichiometric quantity | 180 |
| Comparative example 6 | TME | DDM | Stoichiometric quantity | 150 |
| Comparative example 7 | BAE | DDM | Stoichiometric quantity | 150 |

*Reaction by UV radiation (one hour)

TABLE 2

| No. | Anisotropic structure | Maximum diameter of anisotropic structure (nm) | Ratio of anisotropic structure (vol %) | Thermal conductivity (W/m · k) |
|---|---|---|---|---|
| Embodiment 1 | o | 1600 | 40 | 0.83 |
| Embodiment 2 | o | 1700 | 43 | 0.88 |
| Embodiment 3 | o | 1800 | 45 | 1.05 |
| Embodiment 4 | o | 910 | 35 | 0.78 |
| Embodiment 5 | o | 520 | 38 | 0.69 |
| Embodiment 6 | o | 760 | 26 | 0.68 |
| Comparative example 1 | o | 320 | 37 | 0.44 |
| Comparative example 2 | o | 170 | 29 | 0.30 |
| Comparative example 3 | o | 760 | 22 | 0.33 |
| Comparative example 4 | o | 1000 | 15 | 0.38 |
| Comparative example 5 | o | 280 | 20 | 0.29 |
| Comparative example 6 | o | 130 | 14 | 0.26 |
| Comparative example 7 | x | — | — | 0.19 |

[Embodiments 2 Through 6]

In the method similar to Embodiment 1, we prepared various high-conductive thermosetting resin plates using monomers and hardening agents listed in Table 1 at compounding ratios and hardening temperatures listed in Table 1 for 10 hours.

We checked whether these resin plates had anisotropic structures, measured their thermal conductivities, maximum diameters of the anisotropic structures, and ratios of the anisotropic structures in the manner similar to Embodiment 1. The results of checks and measurements are also listed in Table 1.

Each of these resin plates has anisotropic structures. Maximum diameters of anisotropic structures and ratios of anisotropic structures of the resin plates are respectively 400 nm or more and 25% by volume.

The measured thermal conductivities of these resin plates are 0.68 to 1.05 W/m·K, which is very high. Among them, the resin plates (of Embodiments 1 through 3) using twin mesogen type epoxy resin monomers have greater maximum structure diameters and ratios than those of Embodiments 4 to 6. Their thermal conductivities are also very high (0.83 to 1.05 W/m·K).

From the above results, we can say that the twin mesogen type epoxy resin monomers are effective to increase the maximum structure diameters and ratios of anisotropic structures and to increase the thermal conductivities of the resins.

COMPARATIVE EXAMPLES 1 THROUGH 7

In the method similar to Embodiment 1, we prepared various high-conductive thermosetting resin plates (as comparative examples 1 through 7) using monomers and hardening agents listed in Table 1 at compounding ratios and hardening temperatures listed in Table 1 for 10 hours.

Comparative example 4 was hardened by irradiation of UV rays for one hour.

We checked whether these resin plates had anisotropic structures, measured their thermal conductivities, maximum diameters of the anisotropic structures, and ratios of the anisotropic structures in the manner similar to Embodiment 1. The results of checks and measurements are also listed in Table 2.

The thermal conductivities of resin plates of comparative examples 1 and 2 having the maximum structure diameter of less than 400 nm are respectively 0.44 and 0.30 W/m·K which are low. Similarly, the thermal conductivities of resin plates of comparative examples 3 and 4 having the ratios of anisotropic structures of 25% by volume are respectively 0.33 and 0.38 W/m·K which are lower.

The thermal conductivities of resin plates of comparative examples 5 and 6 having the maximum structure diameter of less than 700 nm and the ratios of anisotropic structures of less than 25% by volume are respectively 0.29 and 0.26 W/m·K which are much lower. However, the thermal conductivity of the resin plate of comparative example 7 which has no anisotropic structure is 0.19 W/m·K which is extremely low.

Figure 2:
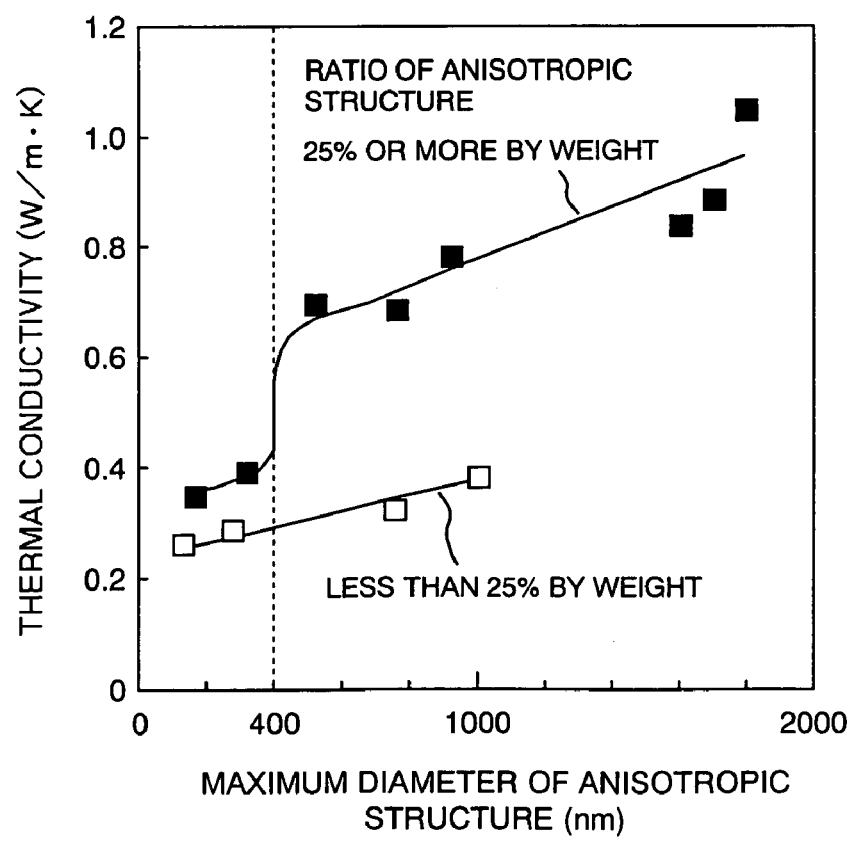
FIG. 2 is a graph showing the relationship between maximum diameter and thermal conductivity of anisotropic structures of the highly thermal conductive hardened thermosetting resin compound of this invention.
Figure 3:
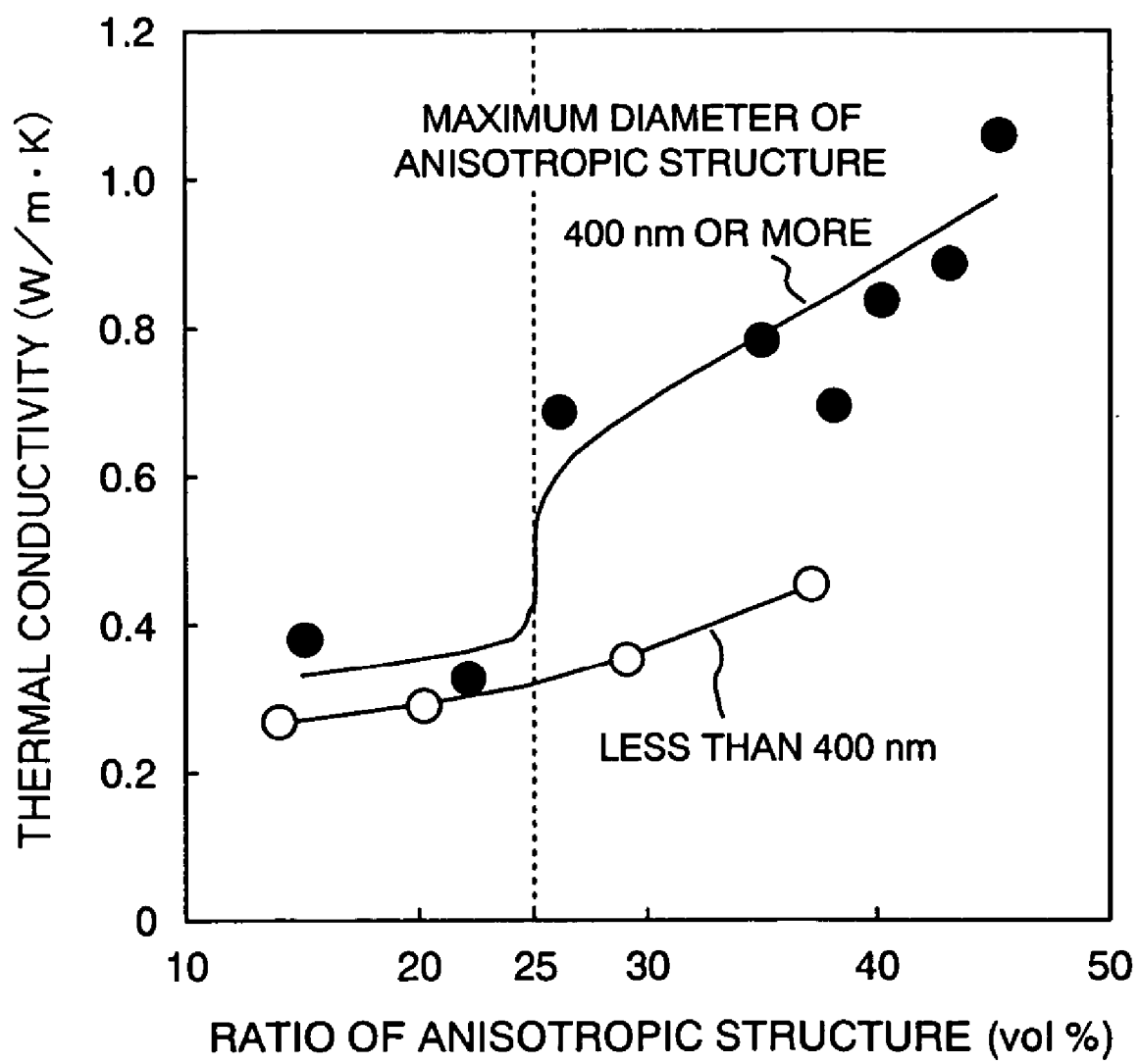
FIG. 3 is a graph showing the relationship between ratio and thermal conductivity of anisotropic structures of the highly thermal conductive hardened thermosetting resin compound of this invention.

FIG. 2 shows the relationship between thermal conductivities and maximum structure diameters of Embodiments 1 through 6 and comparative examples 1 through 7. FIG. 3 shows the relationship between thermal conductivities and ratios of anisotropic structures of Embodiments 1 through 6 and comparative examples 1 through 7.

From FIG. 2, we can see that the thermal conductivity of resin plates having the ratios of anisotropic structures of 25% or more by volume increases rapidly at 400 nm or more (as the maximum structure diameters) and that the thermal conductivity of resin plates having the ratios of anisotropic structures of less than 25% by volume does not increase so much at 400 nm or more.

From FIG. 3, we can see that the thermal conductivity of resin plates having the maximum structure diameters of 400 nm or more increases rapidly at 25% by volume or more (as the ratios of anisotropic structures) and that thermal conductivity of resin plates having the maximum structure diameters of less than 400 nm does not increase so much at 25% by volume or more.

INDUSTRIAL APPLICABILITY

The present invention can provide a highly thermal conductive thermosetting resin compound whose thermal conductivity is increased highly while keeping an almost isotopic spatial structure. When this resin compound is applied as an insulating material to electric and electronic apparatus and the like, the apparatus can dissipate heat effectively.

What is claimed is:

1. A thermoset resin of a thermosetting compound, which contains 25% or more by volume of anisotropic structures in the resin, wherein structural units constituting the anisotropic structures have covalent bonds and have the maximum diameter of the structural units of 520 nm, and wherein the compound is obtained by reaction of 4-(4-oxiranylbutoxy) benzoic acid-1,4'-phenylene ester and 4,4'-diaminophenylbenzoate.

2. A thermoset resin of a thermosetting compound, which contains 25% or more by volume of anisotropic structures in the resin, wherein structural units constituting the anisotropic structures have covalent bonds and have the maximum diameter of the structural units of 760 nm, and wherein the compound is obtained by reaction of 4-(6-acryloylhexyloxy) benzoic acid-1,4'-phenylene ester and benzoyl peroxide.

* * * * *